United States Patent
Wiegman

(10) Patent No.: US 12,249,680 B2
(45) Date of Patent: *Mar. 11, 2025

(54) POWER SOURCE ASSEMBLY SYSTEMS AND METHODS

(71) Applicant: BETA AIR, LLC, South Burlington, VT (US)

(72) Inventor: Herman Wiegman, South Burlington, VT (US)

(73) Assignee: BETA Air LLC, South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/603,352

(22) Filed: Mar. 13, 2024

(65) Prior Publication Data

US 2024/0258552 A1    Aug. 1, 2024

Related U.S. Application Data

(63) Continuation of application No. 17/515,639, filed on Nov. 1, 2021, now Pat. No. 11,961,954.

(51) Int. Cl.
    *H01M 10/04*    (2006.01)
(52) U.S. Cl.
    CPC ............... *H01M 10/0404* (2013.01)

(58) Field of Classification Search
    None
    See application file for complete search history.

(56) References Cited

U.S. PATENT DOCUMENTS

| | | |
|---|---|---|
| 5,407,450 A | 4/1995 | Rose et al. |
| 9,941,542 B1 | 4/2018 | Melack et al. |
| 11,961,954 B2* | 4/2024 | Wiegman ............ H01M 50/211 |
| 2004/0127952 A1 | 7/2004 | O'Phelan et al. |
| 2010/0306995 A1 | 12/2010 | Scheuerman et al. |
| 2014/0023893 A1 | 1/2014 | Shimizu et al. |
| 2015/0037646 A1 | 2/2015 | Wyatt et al. |
| 2015/0054467 A1 | 2/2015 | Takano et al. |
| 2016/0093849 A1 | 3/2016 | DeKeuster et al. |
| 2018/0083306 A1* | 3/2018 | Melack ............ H01M 10/0481 |
| 2021/0273287 A1 | 9/2021 | Mizutani |
| 2022/0059887 A1 | 2/2022 | Takagi et al. |

FOREIGN PATENT DOCUMENTS

| | | |
|---|---|---|
| WO | 8802930 A1 | 4/1988 |
| WO | 2020159081 A1 | 8/2020 |

* cited by examiner

*Primary Examiner* — Alix E Eggerding
(74) *Attorney, Agent, or Firm* — Hoffman Warnick LLC

(57) ABSTRACT

Various techniques are provided to assemble, manufacture, and use a power source. A power source assembly system is provided to apply a compressive force on a plurality of battery cells so that the battery cells may be inserted into a compact container without damaging the battery cells.

20 Claims, 8 Drawing Sheets

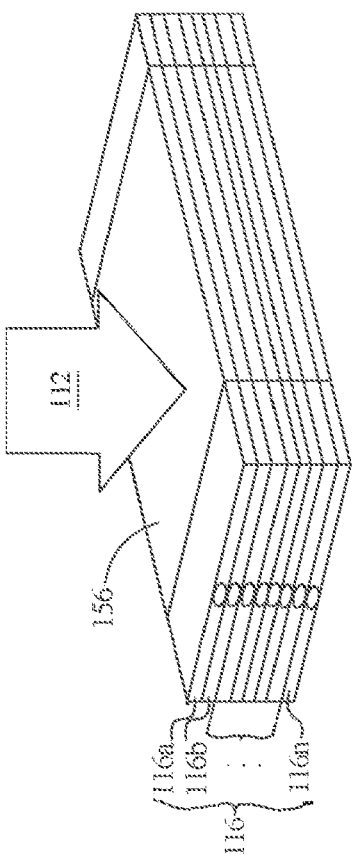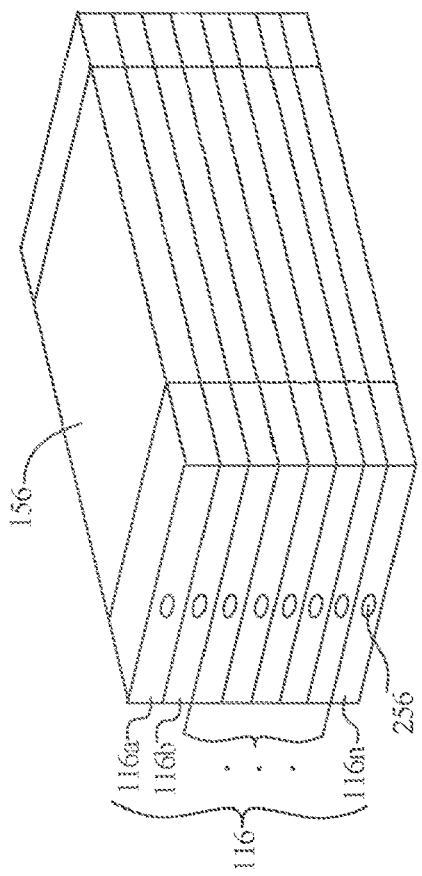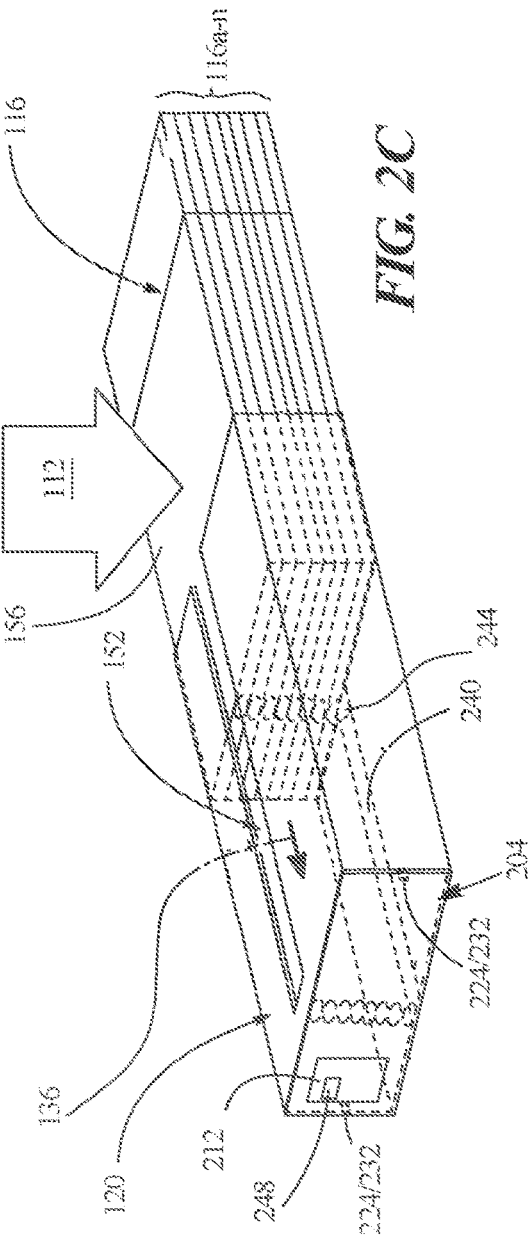
FIG. 2A
FIG. 2B
FIG. 2C

POWER SOURCE ASSEMBLY SYSTEMS AND METHODS

CROSS REFERENCE TO RELATED APPLICATIONS

This application is a continuation of U.S. patent application Ser. No. 17/515,639, filed Nov. 1, 2021, the content of which is incorporated by reference in its entirely herein.

FIELD

The present invention generally relates to the field of power sources. In particular, the present invention is directed to power source assembly systems and methods.

BACKGROUND

A power source needs to pack the maximum amount of energy in the lightest, most compact possible configuration. Furthermore, safe and efficient assembly of a power source is desirable in the manufacturing of a power source to avoid catastrophic failure of the power source or damage to any connected electrical system.

SUMMARY

In an aspect, a power source assembly method is provided, the method comprising: applying a compressive force on a plurality of battery cells using a compression mechanism; inserting at least a portion of the compressed plurality of battery cells into a container; engaging each of the battery cells of the plurality of battery cells with an end cap of the container, where the end cap is configured to maintain the predetermined arrangement of the plurality of battery cells; and releasing the compressive force from at least a portion of the plurality of battery cells.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-2D are diagrammatic representations of aspects of an exemplary embodiment of a power source assembly process in accordance with aspects of the invention;

Figure 1:
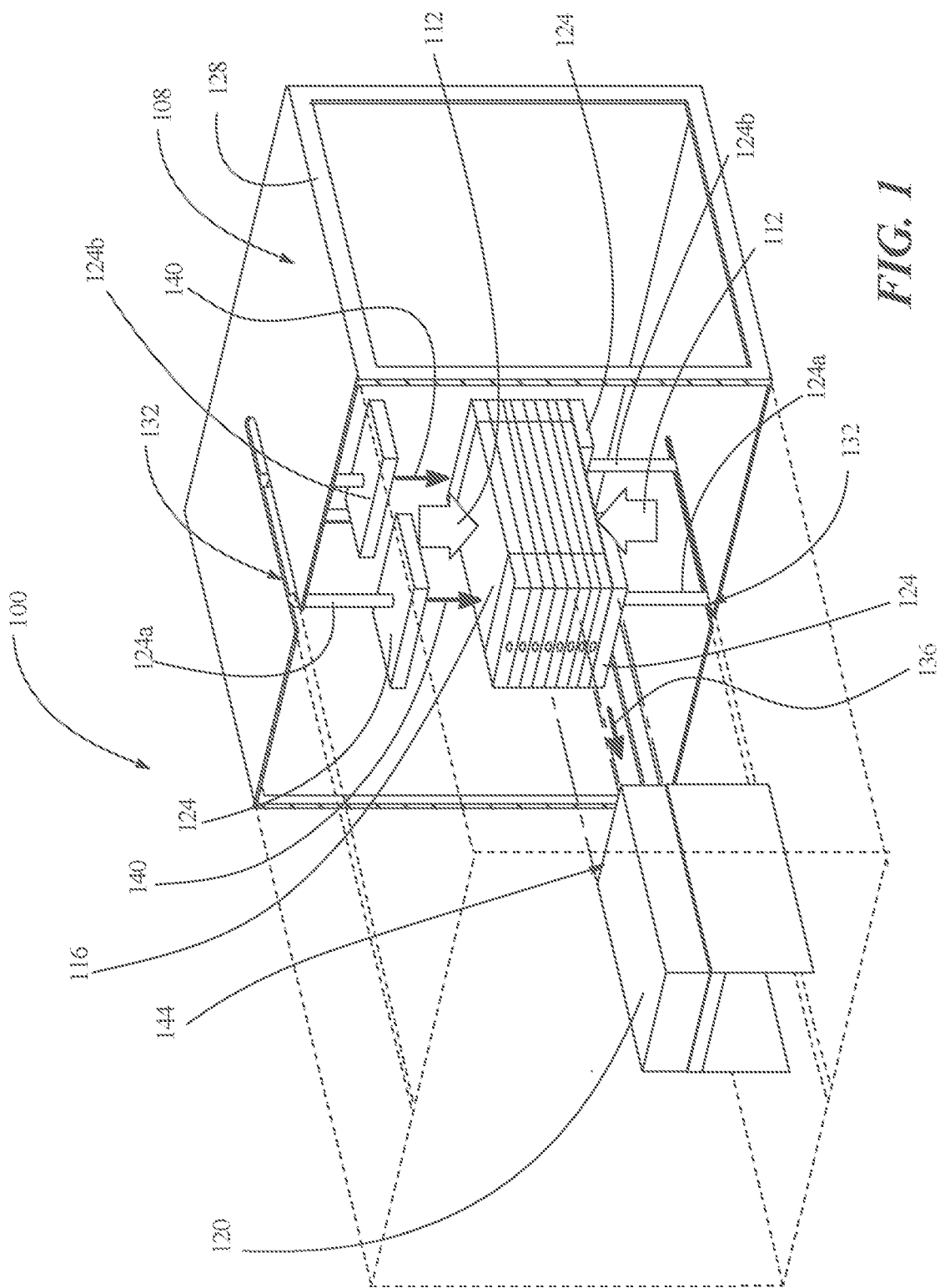
FIG. 1 is a diagrammatic representation of an exemplary power source assembly system in accordance with aspects of the invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to power source assembly systems and methods. Assembling a power source assembly efficiently and accurately is desirable. Furthermore, providing, for example, a high-density power assembly that can provide power to various systems in a compact form increases versatility of the power source assembly.

In the following description, for the purposes of explanation, numerous specific details are set forth in order to provide a thorough understanding of the present invention. It will be apparent, however, that the present invention may be practiced without these specific details. As used in this disclosure, the word "exemplary" or "illustrative" means "serving as an example, instance, or illustration." Any implementation described in this disclosure as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. For purposes of description in this disclosure, the terms "top," "bottom," "upper," "lower," "front," "rear," "right," "left," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed in this disclosure are not to be considered as limiting, unless the claims expressly state otherwise.

As used in this disclosure, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis.

Aspects of the present disclosure describe a compact power source, for example, a high-energy density battery module, for a vehicle such as an eVTOL aircraft. For example, power source may provide electric power to at least a portion of an eVTOL aircraft for manned and/or unmanned flight. In an embodiment, power source may include a plurality of battery cells wired together in series and/or in parallel. In one or more embodiments, power source may be disposed in or on a vehicle such as an eVTOL aircraft, and may provide power to at least a portion of the vehicle. Power source may include thermal management systems and onboard computers to manage power output and general operation. Power source, as a whole, may include hardware for mechanical and electrical connections to at least a portion of a vehicle.

Power source mentioned in this disclosure may be a high energy density battery module. Energy density, as used in this disclosure, is defined as the amount of energy stored in a given system or region of space per unit volume and colloquially, energy per unit mass (also known as "specific energy"), the units of which may be presented in Joules per kilogram (J/kg), kilocalories per gram (kcal/g), British Thermal Units per pound mass (BTU/lb), and in SI base units, meters squared per seconds squared ($m^2/s^2$), and for the purposes of this disclosure Watt hours per kilogram (Wh/kg). In this way, a battery module having a high-energy power density is accomplished. For example, configured as discussed above, power source may include an energy density equal to or greater than 150 Wh/kg. High energy density battery modules may be consistent with disclosure of high energy density battery modules in U.S. patent application Ser. No. 16/948,140 and titled "SYSTEM AND METHOD FOR HIGH ENERGY DENSITY BATTERY MODULE," which is incorporated by reference in its entirety herein. Furthermore, a stack battery may be consistent with disclosure of stack battery packs in U.S. patent application Ser. No. 17/404,500 and titled "STACK BATTERY PACK FOR ELECTRIC VERTICAL TAKE-OFF AND LANDING AIRCRAFT," which is incorporated by reference in its entirety herein.

Figure 2D:
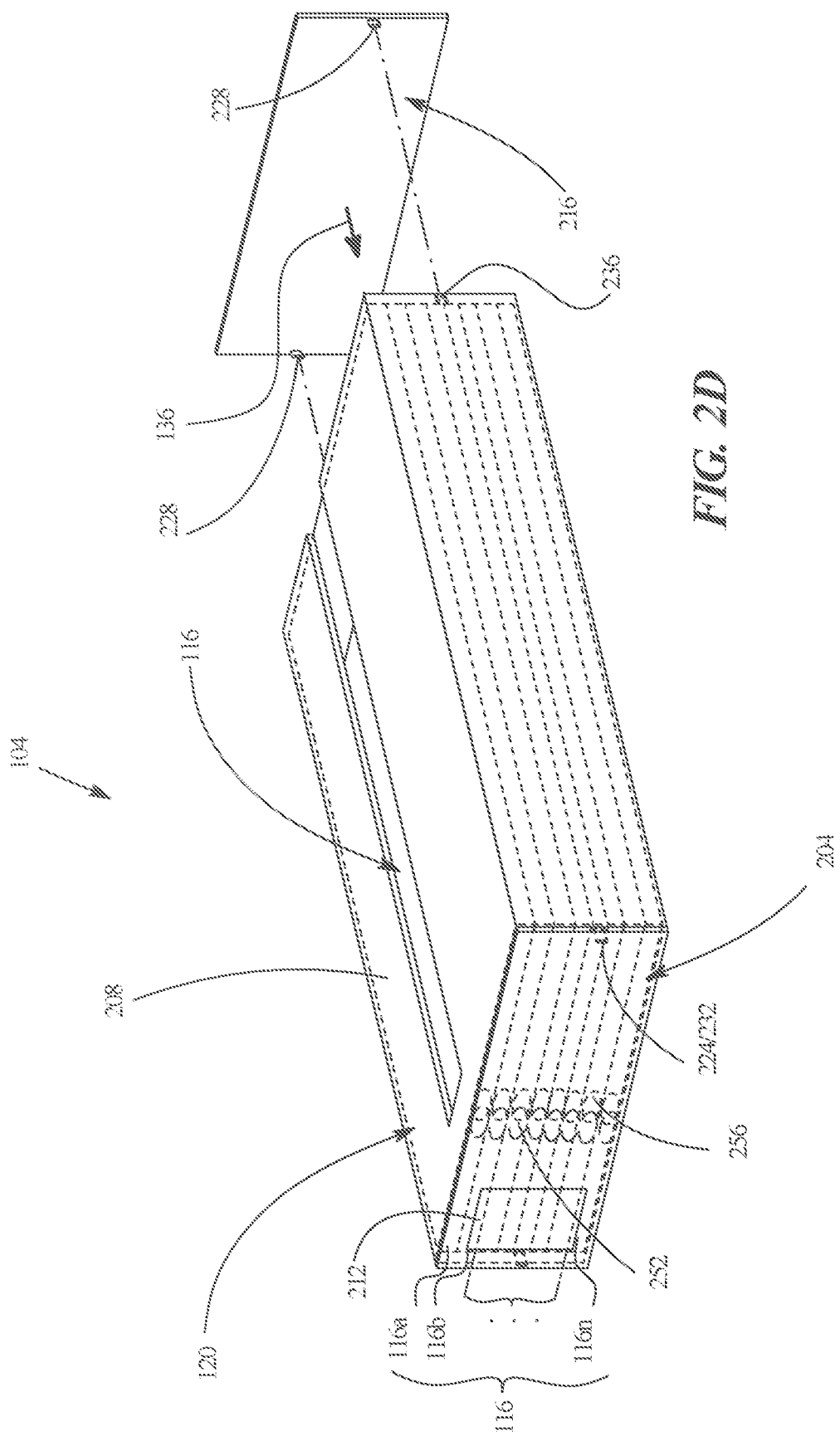

Referring now to the drawings, FIG. 1 shows a semi-transparent isometric view of an exemplary power source assembly system 100 used for assembling various types of power sources, such as a power source 104 (also referred to in this disclosure as a "power source") shown in FIG. 2D. Power source assembly system 100 (also referred to in this disclosure as a "system") includes a compression mechanism 108 that applies a compressive force 112 to a plurality of battery cells 116 during the assembly of power source 104. For the purposes of this disclosure, "a compression mechanism" is a device that applies a compressive force to an object. For example, and without limitation, compression mechanism is used to compact battery cells.

In one or more embodiments, system 100 may include a compression mechanism 108. As previously mentioned, compression mechanism 108 may be used to apply a compressive force 112 to plurality of battery cells 116 (also referred to in this disclosure as "battery cells") during assembly of power source 104. Compressive force 112 may be applied on opposing sides of plurality of battery cells 116, as shown in FIG. 1. Such as, without limitation, compressive force 112 may be applied to opposing sides of battery cells 116 by applying pressure on a top layer of battery cells 116 and on a bottom layer of battery cells 116 to compress all the battery cells 116. For instance, without limitation, battery cells 116 may be decreased in cross-sectional area due to the size of battery cells 116 being reduced along a vertical axis for insertion of battery cells 116 into a container 120, as discussed further in this disclosure.

Compression mechanism 108 may use various techniques to apply compressive force. For example, compression mechanism 108 may be configured to use electrical power, pneumatic pressure, hydraulic pressure, magnetic forces, or any combinations thereof to apply compressive force 112 to battery cells 116. Compression mechanism 108 may include a solenoid, servomotor, motor, electric motor, magnets, ratchet, screw, presser, weights, or the like.

In one or more embodiments, compression mechanism 108 may use direct contact with battery cells 116 to apply compressive force 112, as shown in FIG. 1. For instance, and without limitation, compression mechanism 108 may have one or more moveable arms 124 with abutting surfaces that each contact a corresponding surface of battery cells 116. For example, compression mechanism 108 may use an abutting surface of each arm 124 to apply compressive force 112 on a portion of battery cells 116. In one or more embodiments, the abutting surface of arm 124 may be a form relatively similar to a surface of plurality of battery cells 116 such that the surface of compression mechanism 108 may contact an entire surface of the top layer of plurality of battery cells 116. In other embodiments, the abutting surface may have a surface area less than the surface area of the top layer of battery cells 116 so that the abutting surface only contacts a portion of a surface of the top layer, as shown in FIG. 1. As understood by one skilled in the art, compression mechanism 108 may have one or more pairs of opposing arms depending on the length of battery cells 116 and the method of insertion of compressed battery cells 116 into container 120.

In one or more embodiments, compression mechanism 108 may use indirect contact with battery cells 116 to apply compressive force 112 on battery cells 116. For example, magnetic or superconductive pads may be used to apply compressive force 112 to battery cells 116, which may be positioned between magnetic pads.

In an exemplary embodiment of system 100, system 100 may include a frame 128. Moveable arms (also referred to herein as "arms") of compression mechanism 108 may be attached to frame 128 and extend therefrom. Moveable arms 124 may be moved in various directions relative to frame 128. For example, moveable arms may move linearly, moveable arms may be pivoted or rotated about a point for a desired amount, and moveable arms may be slidably displaced relative to frame 128. Arms 124 of compression mechanism 108 may be used to apply a pressure, such as a compressive force 112, to battery cells 116 during the assembly of power source 104, as discussed in this disclosure further below. For purposes of this disclosure, a "compressive force" is a force applied on an object that compacts the object.

In another exemplary embodiment, frame 128 may include one or more guides 132. Guides 132 may provide support for arms 124. For instance, and without limitations, arms 124 may traverse along guides 132 to move battery cells 116 toward container 120 (as indicated by directional arrow 136). Arms 124 may also transverse through guides 132 toward battery cells 116 (as indicated by directional arrows 140) to accurately apply compressive force 112 to battery cells 116. In one or more embodiments, once compressed battery cells 116 have been moved by arms 124 toward an opening 144 of container 120, each arm 124 may be retracted from battery cells 116 as each corresponding portion of battery cells is inserted into container 120 through opening 144. For example, front arms 124a may be moved away from a corresponding front portion of battery cells 116 as first portion approaches or is inserted into opening 144 of container 120. Additionally, rear arms 124b may be removed from second portion of battery cells 116 as second portion is advanced through opening 144 of container 120. In one or more embodiments, frame 128 may include a rear panel (not shown) to push battery cells 116 forward into container 120. In other embodiments, container 120 may include a slot 152

(shown in FIGS. 2C-2D) so that arms may traverse along slot 152 and continue to apply compressive force 112 to battery cells 116 as battery cells 116 are advanced into container 120. For example, arms 124 may maneuver through slot 152 so that arms 124 of compression mechanism 108 may remain in physical contact with plurality of battery cells 116 until battery cells 116 are fully secured within container 120.

Still referring to FIG. 1, frame 128 may include side panels (not shown) that may abut one or both sides of battery cells 116 to prevent lateral movement of battery cells 116. For instance, the side panels may contact a right side and a left side of battery cells 116 to prevent battery cells 116 from sliding out of position from a predetermined arrangement. For instance, and without limitation, when battery cells 116 are compressed, side panels may abut the left and right sides of battery cells 116 to prevent individual cells (e.g., a battery cell 116a-n shown in FIGS. 2A-2D) from shifting out of a stacked arrangement. For the purposes of this disclosure, a predetermined arrangement of battery cells refers to a specific desired assortment, such as orientation and quantity, of battery cells. A protective wrapping 156 may also be used to maintain the predetermined arrangement of battery cells 116, as discussed further below. Though battery cells 116 are shown as a single stacked column, as understood by one skilled in the art, a plurality of columns of stacked battery cells 116 may be inserted and fitted into container 120. In other embodiments, battery cells 116 may be in a staggered arrangement. The staggered arrangement allows more battery cells 116 to be disposed closer together than in square columns and rows like in a grid pattern. The staggered arrangement may also be configured to allow better thermodynamic dissipation. In other embodiments, container 120 may be assembled about compressed battery cells 116.

Now referring to FIGS. 2A-D, the method of assembly of power source 104 is illustrated. As shown in FIG. 2A, battery cells 116 may include individual battery cells 116a-n (also referred to in this disclosure as a "battery cell," "each battery cell," or "one of the plurality of battery cells"). Furthermore, battery cells 116 may be placed in a predetermined arrangement, as previously discussed in this disclosure. For example, battery cells 116 may be stacked in layers where battery cell 116a sits atop battery cell 116b, which in turn sits atop a desired number of intermediary battery cells until the bottom battery cell 116n. As understood by one skilled in the art, battery cells 116 may include any number of individual battery cells without changing the scope or spirit of the invention.

In one or more embodiments, a stack of battery cells 116 may include various battery cells and non-cell layers. For example, battery cells may include a non-cell layer of protective wrapping 156. In one or more embodiments, each battery cell 116a-n of the plurality of battery cells 116 may include protective wrapping 156. For example, cell and non-cell layers may alternate in a stacked arrangement of battery cells 116. In other embodiments, the plurality of battery cells 116 may be wrapped as a whole in protective wrapping 156. In one or more embodiments, protective wrapping 156 may include a thermally insulating material. In one or more embodiments, protective wrapping 156 may be woven between the plurality of battery cells 116. Protective wrapping 156 may provide fire protection, thermal containment, and thermal runaway during a battery cell malfunction or within normal operating limits of one or more battery cells 116 and/or potentially, power source 104 as a whole. Protective wrapping 156 may be woven between each battery cell 116a-n and be configured to thermally insulate each battery cell 116a-n from another. Protective wrapping 156 can be configured to provide thermal containment for each battery cell 116a-n within power source 104. In embodiments, protective wrapping 156 may be woven in a plurality of ways including plain weaving, oxford weaving, braiding, and plaiting, among others. In this way each battery cell 116a-n may be captured in its own wrapping, thermally isolating each battery cell 116a-n from the next. Protective wrapping 156 may be configured to prevent thermal runaway due to heat energy generated by battery cells 116. Protective wrapping 156 may include fire protection material configured to contain a fire in an area in which it surrounds. Fire protection material, in general, may include fire-retardant and/or fire-resistant materials. Fire-retardant material is designed to burn slowly and therefore slow down the movement of fire through the medium of the material, thereby protecting components on the other side of it in time for countermeasures to be deployed, amongst other mitigation methods. Fire-resistant materials are configured to resist burning and withstand heat and, in the application of protective wrapping, may contain fire and heat energy in the location it is present, thereby preventing it from damaging other locations in power source 104 or surrounding areas. Fire-retardant materials used in textiles similar or the same to protective wrapping may include aramids, FR cotton, coated nylon, carbon foam (CFOAM), polyhydroquinone, dimidazopyridine, melamine, modacrylic, leather, Polybenzimidazole (PBI), and the like.

Physical separation of each battery cell 116a-n serves to thermally insulate each battery cell 116a-n. It should be noted as well that with a serpentine wrapping, a full wrap of each cell may be accomplished using a single sheet (or unit in which it is produced or cut) of protective wrapping 156. An advantage of this single protective wrapping 156 may include ease of installation and maintenance and in no way limits the assembly from individually wrapping cells with material or precludes the use of more than one protective wrapping in a similar or unique arrangement.

In one or more embodiments, battery cells 116 may include a liquid electrolyte. In one or more embodiments, a battery cell 116a-n may be configured to include an electrochemical reaction that produces electrical energy sufficient to power various systems. For example, and without limitation, battery cells 116 may power at least a portion of an electric aircraft, such as an eVTOL aircraft. In other exemplary embodiments, power source 104 may be used to power a vehicle or a smaller system, such as a drone or computing device. Battery cell 116a-n may include electrochemical cells, galvanic cells, electrolytic cells, fuel cells, flow cells, voltaic cells, or any combination thereof.

In one or more embodiments, each battery cell 116a-n may be electrically connected in series, in parallel, or a combination of series and parallel. Series connection, as used in this disclosure, includes wiring a first terminal of a first cell to a second terminal of a second cell and further configured to include a single conductive path for electricity to flow while maintaining the same current (measured in Amperes) through any component in the circuit.

Battery cells 116 may use the term "wired," but one of ordinary skill in the art would appreciate that this term is synonymous with "electrically connected," and that there are many ways to connect electrical elements like battery cells 116 together. As an example, battery cells 116 can be connected via prefabricated terminals of a first gender that mate with a second terminal with a second gender. Parallel connection, as used in this disclosure, includes wiring a first and a second terminal of a first battery cell to a first and a second terminal of a second battery cell, respectively, and further configured to have more than one conductive path for electricity to flow while maintaining the same voltage (measured in Volts) across any component in the circuit. Battery cells 116 may be wired in a series-parallel circuit which combines characteristics of the constituent circuit types to this combination circuit. Battery cells 116 may be electrically connected in any arrangement which may confer onto the system the electrical advantages associated with that arrangement such as high-voltage applications, high-current applications, or the like.

Battery cell 116a-n may take a plurality of forms, but for the purposes of these illustrations and disclosure, will be represented as a rectangular prism with a rectangle representing the cross section of one cell each. With this orientation, a rectangular prism battery cell has a long axis.

As shown in FIG. 2B, battery cells 116 may be compressed by compressive force 112 applied by compression mechanism 108, as previously discussed in this disclosure. In one or more embodiments, compressive force 112 may compact each battery cell 116a-n along the vertical axis so that a height h of battery cells 116 is reduced to a height h', thus, allowing battery cells 116 to fit into a more compact packaging, such as container 120. Battery cells 116 may be, for example, pouches so as to allow compression of battery cells 116, as discussed in this disclosure. Battery cells 116 may include flexible pouches such that they may be easily compressed by compression mechanism 108 without breaking, tearing, or sheering.

In one or more embodiments, battery cells 116 may include prevention of progression of thermal runaway between battery cells 116. For example, and without limitation, battery cells 116 may include pouch cells to contain ejecta resulting from thermal runaway of a battery cell. Additionally, in some cases, pouch battery cells may be configured to reduce weight of a power source. A pouch cells of this disclosure may be consistent with disclosure of pouch cells in U.S. patent application Ser. No. 17/348,960 and titled "BATTERY PACK FOR ELECTRIC VERTICAL TAKE-OFF AND LANDING AIRCRAFT," which is incorporated by reference in its entirety herein.

A pouch cell may include an insulator layer. As used in this disclosure, an "insulator layer" is an electrically insulating material that is substantially permeable to battery ions, such as, for example, lithium ions. In some cases, insulator layer may be referred to as a separator layer or separator. In some cases, insulator layer is configured to prevent electrical communication directly between at least a pair of, for example, a cathode and anode of the battery cell. In some cases, insulator layer may be configured to allow for a flow of ions across it. Insulator layer may consist of a polymer, such as without limitation polyolefin (PO). Insulator layer may include pours which are configured to allow for passage of ions, for example, lithium ions.

In some cases, a pouch may include a polymer, such as and without limitation, polyethylene, acrylic, polyester, and the like. In some cases, pouch may be coated with one or more coatings. For example, in some cases, pouch may have an outer surface coated with a metalizing coating, such as an aluminum or nickel-containing coating. In some cases, pouch coating may be configured to electrically ground and/or isolate pouch, increase the pouch's impermeability, increase the pouch's resistance to high temperatures, increases the pouch's thermal resistance (insulation), or the like.

In one or more embodiments, power source 104 may also include an ejecta barrier. Ejecta barrier may be located substantially between a first pouch cell and a second pouch cell. As used in this disclosure, an "ejecta barrier" is any material or structure that is configured to substantially block, contain, or otherwise prevent passage of ejecta. As used in this disclosure, "ejecta" is any material that has been ejected, for example, from a battery cell. In some cases, ejecta may be ejected during thermal runaway of a battery cell. Alternatively or additionally, in some cases, ejecta may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cooled and condensed into a solid or liquid after ejection. In some cases, ejecta barrier may be configured to prevent materials ejected from a first pouch cell from coming into contact with a second pouch cell. For example, in some instances, an ejecta barrier is substantially impermeable to ejecta from battery pouch cell. In some embodiments, an ejecta barrier may include titanium. In some embodiments, an ejecta barrier may include carbon fiber. In some cases, an ejecta barrier may include at least a one of a lithiophilic or a lithiophobic material or layer configured to absorb and/or repel lithium-based compounds. In some cases, ejecta barrier may include a lithiophilic metal coating, such as silver or gold. In some cases, ejecta barrier may include a sheet, a film, a foil, or the like. For example, and without limitation, ejecta barrier may be between 25 and 5,000 micrometers thick. In some cases, ejecta barrier may have a nominal thickness of about 2 mm. Alternatively or additionally, in some cases, ejecta barrier may include rigid and/or structural elements, for instance, and without limitation, which are solid. Rigid ejecta barriers may include metals, composites, and the like. In some cases, ejecta barrier may be further configured to structurally support at least a pouch cell. For example, in some cases, at least a pouch cell may be mounted to a rigid ejecta barrier.

FIG. 2C shows compressed battery cells 116 being inserted into container 120. In one or more embodiments, at least a portion of compressed plurality of battery cells 116 may be inserted into container 120. Container 120 may be any shape or size that allows container 120 to receive battery cells 116. Such as, without limitation, container 120 may be a rectangular prism. According to one or more embodiments, container 120 may include at least an end cap 204 and a body 208. For the purposes of this disclosure, an "end cap" is a protective lid used to cover an opening of a container and/or seal the container. Container 120 may also include a second end cap 216, as shown in FIG. 2D. Container 120 provides a protective layer of material configured to create a barrier between internal components of power source 104 and environmental components. For example, container 120 may protect battery cells 116 from other aircraft components or environment. Body 208 may include opposite and opposing faces that form two sides, such as a left and right side, and a top and bottom of container 120 that encapsulate at least a portion of battery cells 116. Container 120 may include metallic materials like aluminum, aluminum alloys, steel alloys, copper, tin, titanium, another undisclosed material, or a combination thereof. Container 120 may not preclude use of nonmetallic materials alone or in combination with metallic components permanently or temporarily coupled together. Nonmetallic materials that may be used alone or in combination in the construction of side container 120 may include high density polyethylene (HDPE), polypropylene, polycarbonate, acrylonitrile butadiene styrene, polyethylene, nylon, polystyrene, polyether ether ketone, or any combination thereof. Container 120 may be manufactured by a number of processes alone or in combination, including but not limited to, machining, milling, forging, casting, 3D printing (or other additive manufacturing methods), turning, injection molding, or any combination thereof. One of ordinary skill in the art would appreciate that container 120 may be manufactured in pieces (e.g., body 208 and end cap 204) and assembled together by screws, nails, rivets, dowels, pins, epoxy, glue, welding, crimping, or another undisclosed method alone or in combination. In one or more embodiments, container may include an electrical contact having an electrical connection with each battery cell 116*a-n* of the at least a portion of plurality of battery cells 116. Container 120 may include an injection molded component. The injection molded component may include a component manufactured by injecting a liquid into a mold and letting it solidify, taking the shape of the mold in its hardened form. In other embodiments, container 120 may be made from fiberglass. In other embodiments, container may be made from a polymer. Such as, without limitations, container 120 may be formed as multiple pieces or as a monolithic structure from a mold using plastic or resin. Container 120 may be used as a heat sink. Such as, without limitations, container 120 may be made from aluminum. Container 120 may include liquid crystal polymer, polypropylene, polycarbonate, acrylonitrile butadiene styrene, polyethylene, nylon, polystyrene, polyether ether ketone, and the like. Container 120 may use a boss 224 to seal body 208 using end caps 204, 216, a flange, or any other mechanism that allows end caps to be securely attached to body 208.

Container 120 may be coupled to a sense board 212 through standard hardware like a bolt and nut mechanism, for example.

Body 208 is configured to provide structure and encapsulate at least a portion of battery cells 116 and, if applicable, protective wrapping 156. End cap 204 may be configured to encapsulate at least a portion of battery cells 116 disposed within body 208 of container 120. Each end cap 204, 216 may be secured to body 208 using various mechanisms. For example, each end cap 204, 216 may include one or more protruding bosses 224 and 228, respectively, that click into receptacles 232 and 236, respectively, in opposing ends of body 208. Body 208 may provide two opposing side panels configured to encapsulate at least a portion of battery cells 116.

In one or more embodiments, body 208 may include a vertical slit (not shown), which allows a user to readily ascertain the number of battery cells 116 disposed within container 120 without opening container 120 (e.g., removing an end cap). Furthermore, the slit may allow a user to determine if there is leakage from one of battery cells 116*a-n*.

As previously mentioned, container 120 includes opening 144, which compressed battery cells 116 may be inserted into. Second end cap 216 may be placed over opening 144 once battery cells are fully inserted into container 120 to seal container 120 and fully enclose battery cells 116 within container 120. In one or more embodiments, container 120 may include a groove 240 disposed along at least one side of container 120 that is configured to engage at least a portion of battery cells 116 and align the at least a portion of plurality of battery cells 116 relative to container 120. In one or more embodiments, at least a portion of the plurality of battery cells 116 is fully disposed within container 120.

Container 120 may be configured to hold battery cells 116 in fixed positions once battery cells 116 are inserted into body 208. For example, container 120 may have one or more fasteners 252 that engages complementary fasteners 256 on each end of a battery cell 116*a-n* to ensure the battery cells 116 remain in the predetermined arrangement. For the purposes of this disclosure, a "container" is an object that holds, stores, and/or protects contents disposed therein. In one or more embodiments, container 120 may include a groove 240. Groove 240 may traverse along an inner surface of body 208 and engage a portion of one or more of the plurality of battery cells 116. For instance, without limitation, bottom battery cell 116*n* may have a complementary surface, such as a rib 244, that may be disposed within groove 240 of container 120 and traverse along groove 240 to allow battery cells 116 to easily slide within container 120. In one or more embodiments, groove 240 may also be used to distribute heat that may be generated by battery cells 116.

According to embodiments, container 120 may include end cap 204, which is configured to encapsulate at least a portion of container 120 and enclose at least a portion of battery cells 116 within container 120. End cap 204 may provide structural support for container 120. In other embodiments, end cap 204 may hold battery cells 116 in a fixed position relative to container 120 once battery cells 116 have been inserted into body 208 of container 120. End cap 204 may have a protruding boss on a first end that mates up with and snaps into a receiving feature on a first end of body 208. End cap 204 may include a second protruding boss on a second end that mates up with and snaps into a receiving feature on sense board 212. Sense board 212 may be consistent with the sense board disclosed in U.S. patent application Ser. No. 16/948,140 entitled, "SYSTEM AND METHOD FOR HIGH ENERGY DENSITY BATTERY MODULE," which is incorporated herein by reference in its entirety. Additionally, second end cap 204 may have a protruding boss on a first end that mates up with and snaps into a receiving feature on a second end of body 208. Second end cap 204 may also include a second protruding boss on a second end that mates up with and snaps into a receiving feature on sense board 212. In one or more embodiments, end cap 204 may include a non-electrically conductive component.

Body 208 of container 120 may include opposing side panels that may encapsulate two sides of battery cells 116. The side panels may include opposite and opposing inner faces made from a metal or composite material. Container 120 may provide structural support for battery cells 116 and provide a barrier to separate battery cells 116 from exterior components within a system of use, such as a vehicle.

In one or more embodiments, container 120 may include a sense board 212 configured to detect a temperature of a battery cell 116*a-n* of at least a portion of the plurality of battery cells 116. Container 120 may further include a thermal sensor 248 communicatively and electrically connected to sense board 212 that is configured to detect thermal energy or the temperature of one or more battery cells 116*a-n* of the plurality of battery cells 116 and translate the detected information to sense board 212. In one or more embodiments, container 120 includes various other types of sensors. Such as, without limitation, container 120 includes a sensor configured to detect when each of the plurality of battery cells 116 are engaged with the fastener of end cap 204.

End cap 204 may include a nonconductive component configured to align sense board 212 and battery cells 116 and hold their position. End cap 204 may form an end of and encapsulate a portion of a first end of power source 104 and the second opposite and opposing end cap 216 may form a second end and encapsulate a portion of a second end of power source 104. As previously mentioned in this disclosure, end cap 204 may have a snap attachment mechanism having a protruding boss 224 which is configured to be captured, at least in part by receptacle 232 of a corresponding size disposed in body 208. In one or more embodiments, end cap 204 may employ a similar or same method for connecting itself to sense board 212, which may have a similar or the same receptacle. One of ordinary skill in the art would appreciate that the embodiments of a quick attach/detach mechanism end cap is only an example and any number of mechanisms and methods may be used for this purpose. It should also be noted that other mechanical connecting mechanisms may be used that are not necessarily designed for quick removal. Such mechanical connecting may include, as non-limiting examples, rigid connecting (e.g., beam connecting), bellows connecting, bushed pin connecting, constant velocity, split-muff connecting, diaphragm connecting, disc connecting, donut connecting, elastic connecting, flexible connecting, fluid connecting, gear connecting, grid connecting, hirth joints, hydrodynamic connecting, jaw connecting, magnetic connecting, Oldham connecting, sleeve connecting, tapered shaft lock, twin spring connecting, rag joint connecting, universal joints, or any combination thereof. End cap 204 may include a non-conductive component manufactured from or by a process that renders it incapable or unsuitable for conveying electrical through, on, or over it. Nonconductive materials end cap 204 may be paper, Teflon, glass, rubber, fiberglass, porcelain, ceramic, quartz, various plastics like HDPE, ABS, among others, alone or in combination.

In one or more embodiments, end cap 204 may include an electrical bus. The electrical bus, for the purposes of this disclosure and in electrical parlance, is any common connection to which any number of loads, which may be connected in parallel, and share a relatively similar voltage may be electrically coupled. The electrical bus may refer to power busses, audio busses, video busses, computing address busses, and/or data busses. The electrical bus may be responsible for conveying electrical energy stored in power source 104 to at least a portion of a system of use, such as an eVTOL aircraft. In an exemplary embodiment, the same or a distinct electrical bus may additionally or alternatively be responsible for conveying electrical signals generated by any number of components within power source 104 to any destination on or offboard an eVTOL aircraft. End cap 204 may include wiring or conductive surfaces only in portions required to electrically couple the electrical bus to electrical power or necessary circuits to convey that power or signals to their destinations.

With continued reference to FIGS. 2C and 2D, sense board 212 may be disposed on end cap 204 (shown) or body 208 (not shown). Sense board 212 may have at least a portion of a circuit board that includes one or more sensors configured to, for example, measure the temperature of battery cells 116 disposed within power source 104. In one or more embodiments, sense board 212 may include one or more openings disposed in rows and column on a surface of sense board 212. In embodiments, each hole may correspond to a battery cell 116a-n disposed within, encapsulated, at least in part, by container 120. For example, the location of each hole may correspond to the location of each battery cell 116a-n disposed within container 120.

Sense board 212 may include a battery management system, which may monitor battery cells 116 in a plurality of ways including temperature and voltage as discussed further in this disclosure. A battery management system may be consistent with disclosure of battery management system in U.S. patent application Ser. No. 17/111,002 and titled "SYSTEMS AND METHODS FOR A BATTERY MANAGEMENT SYSTEM INTEGRATED IN A BATTERY PACK CONFIGURED FOR USE IN ELECTRIC AIRCRAFT", which is incorporated herein by reference in its entirety. In one or more embodiments, sense board 212 may include one or more circuits and/or circuit elements, including and without limitation, a printed circuit board component, aligned with a first side of battery cells 116. Sense board 212 may include, without limitation, a control circuit configured to perform and/or direct any actions performed by sense board 212 and/or any other component and/or element described in this disclosure. Control circuit may include any analog or digital control circuit, including without limitation a combinational and/or synchronous logic circuit, a processor, microprocessor, microcontroller, or the like.

Sense board 212 may include one or more sensors 248. In embodiments, sensor 248 may be a humidity sensor. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor may be psychrometer. Humidity sensor may be a hygrometer. Humidity sensor may be configured to act as or include a humidistat. A "humidistat", for the purposes of this disclosure, is a humidity-triggered switch, often used to control another electronic device. Humidity sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

Still referring to FIGS. 2C and 2D, sense board 212 may further include battery management system, where the battery management system may monitor the plurality of battery cells 116a-n in numerous ways. Sense board 212 may include one or more sensors 248, for example, a sensor configured to measure a temperature, and as a whole is further configured to detect failure within each battery cell of the plurality of battery cells 116a-n. Battery cell failure may be characterized by a spike in temperature, wherein sense board 212 may be configured to detect the increase in temperature. Sense board 212 may be further configured to comprise sensors configured to measure a voltage and as a whole is further configured to detect a failure within, for example, first battery cell 116a and/or any other battery cell 116b-n. Cell failure may be further characterized by a spike and/or depletion in voltage, wherein sense board 212 may be configured to detect the increase and/or decrease in voltage. Sense board 212 may be further configured to generate signals to, as non-limiting examples, notify users, support personnel, safety personnel, maintainers, operators, emergency personnel, aircraft computers, or any combination thereof. Sense board 212 may be configured to comprise thermocouples, thermistors, thermometers, passive infrared sensors, resistance temperature sensors (RTD's), semiconductor based integrated circuits (IC), a combination thereof or another undisclosed sensor type, alone or in combination.

Temperature, for the purposes of this disclosure, and as would be appreciated by someone of ordinary skill in the art, is a measure of the heat energy of a system. Heat energy is, at its core, the measure of kinetic energy of any or all matter present within a system. Temperature, as read by any number or combinations of sensors present on sense board 212, may be measured in Fahrenheit (° F.), Celsius (° C.), Kelvin (° K), or another scale alone or in combination. The temperature measured by sensors may comprise electrical signals which are transmitted to appropriate destination wirelessly or through a wired connection. Outputs from sensors or any other component present within system may be analog or digital. Onboard or remotely located processors can convert those output signals from a sensor suite to a usable form by the destination of those signals. The usable form of output signals from sensors, through processor may be either digital, analog, a combination thereof or an otherwise unstated form. Processing may be configured to trim, offset, or otherwise compensate the outputs of the at least a sensor. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components. Persons skilled in the art, upon reviewing the entirety of this disclosure, will be aware of battery management systems that may be used in combination with the sense board consistently with this disclosure.

Still referring to FIGS. 2C and 2D, sense board 212 may include sensors configured to measure physical and/or electrical parameters, such as without limitation temperature and/or voltage, of battery cells 116. Sense board 212 and/or a control circuit incorporated therein and/or communicatively connected thereto, may further be configured to detect failure within each battery cell 116*a-n*, for instance and without limitation, as a function of and/or using detected physical and/or electrical parameters. Cell failure may be characterized by a spike in temperature and sense board 212 may be configured to detect that increase and generate signals, which are discussed further below, to notify users, support personnel, safety personnel, maintainers, operators, emergency personnel, aircraft computers, or a combination thereof. Sense board 212 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Heat energy is, at its core, the measure of kinetic energy of matter present within a system. Temperature, as measured by any number or combinations of sensors present on sense board 212, may be measured in Fahrenheit (° F.), Celsius (° C.), Kelvin (° K), or another scale alone or in combination. The temperature measured by sensors may include electrical signals which are transmitted to their appropriate destination wirelessly or through a wired connection.

Alternatively or additionally, sense board 212 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

In one or more embodiments, sense board 212 and/or a control circuit incorporated therein and/or communicatively connected thereto may be configured to adjust charge to battery cells 116 as a function of a charge level and/or a detected parameter. For instance, and without limitation, sense board 212 may be configured to determine that a charge level of a battery cell is high based on a detected voltage level of that battery cell. Sense board 212 may alternatively or additionally detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like.

Sense board 212 and/or a control circuit incorporated therein and/or communicatively connected thereto may be configured to adjust charge to at least one battery cell of the plurality of battery cells as a function of the detected parameter (this may include adjustment in charge as a function of detection of a charge reduction event). Alternatively or additionally, sense board 212 and/or a control circuit incorporated therein and/or communicatively connected thereto may be configured to increase charge to a cell upon detection that a charge reduction event has ceased. For instance, sense board 212 and/or a control circuit incorporated therein and/or communicatively connected thereto may detect that a temperature of a subject battery cell has dropped below a threshold, and may increase charge again. Charge may be regulated using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Still referring to FIGS. 2C and 2D, sense board 212 may include a high current busbar and integral electrical connections. Sense board 212, and further battery management system of power source 104 may charge individual battery cells 116*a-n* depending on battery cell charge levels. Charging may be balanced throughout the plurality of battery cells 116 by directing energy through balance resistors by dissipating current through resistors as heat. In this manner, battery cells may be charged evenly, for example, cells with a lower amount of electrical energy will charge more than battery cells with a greater amount of energy. Cell charge balancing may be controlled via any means described above for regulation of charge levels, including without limitation metal oxide silicon field effect transistor or a metal oxide semiconductor field effect transistor (MOSFET).

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof, or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

Figure 3:
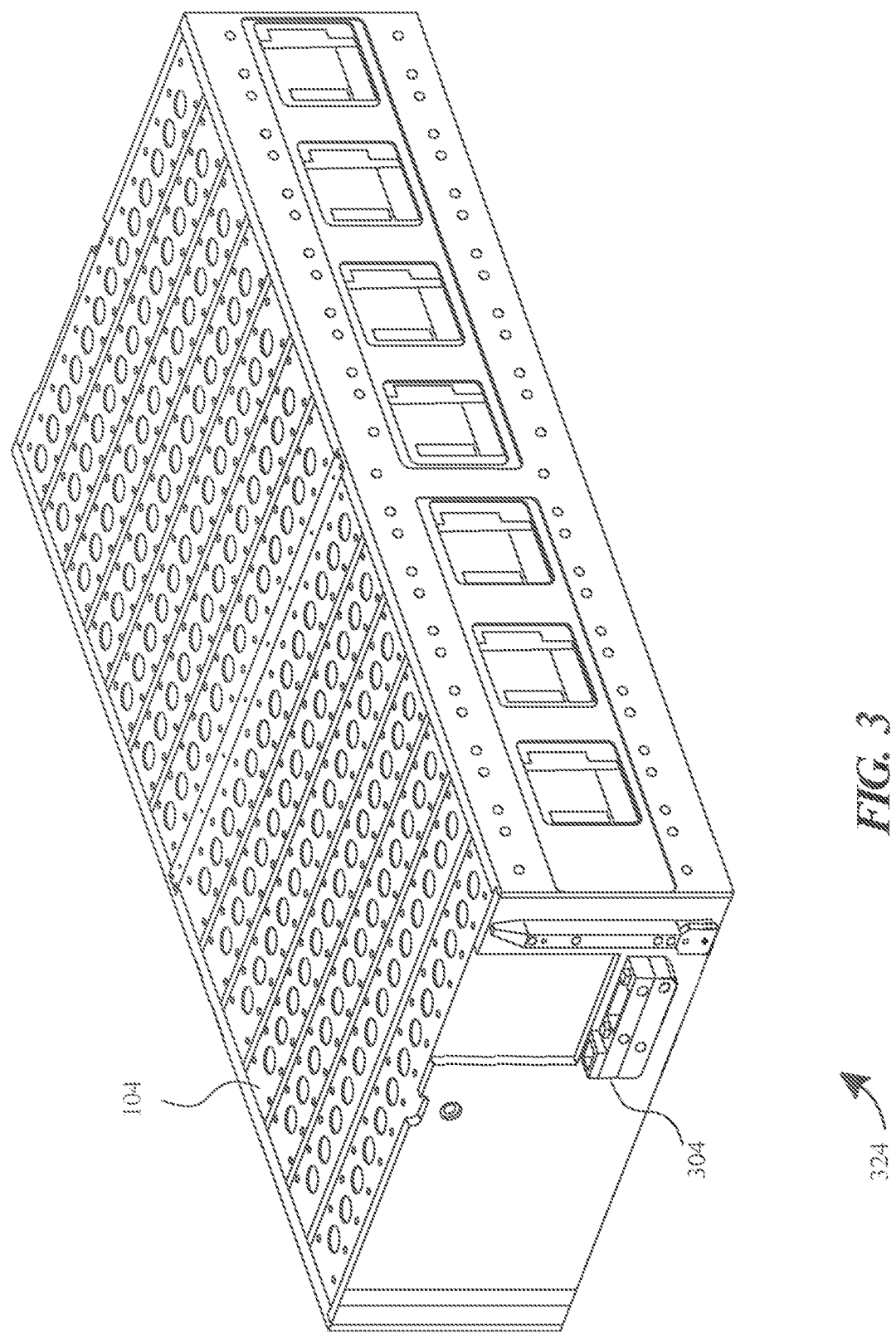
FIG. 3 is an illustration of an exemplary embodiment of a power source assembly in isometric view in accordance with aspects of the invention.

With reference to FIG. 3, an exemplary embodiment of a battery pack 324 that includes a plurality of power sources 104 is illustrated. As previously discussed, power source 104 may be configured to store electrical energy in the form of a plurality of battery cells or battery modules, which themselves include of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may when used in conjunction with other cells, be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired", but one of ordinary skill in the art would appreciate that this term is synonymous with "electrically connected", and that there are many ways to couple electrical elements like battery cells together. An example of a connector that does not include wires may be prefabricated terminals of a first gender that mate with a second terminal with a second gender. Battery cells may be wired in parallel. A parallel connection includes wiring a first and a second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like.

With continued reference to FIG. 3, power source 104 may include a plurality of battery cells. The battery cells may be wired together in series and in parallel. Power source 104 may include a center sheet which may include a thin barrier. Barrier may include a fuse connecting battery cells on either side of the center sheet. Fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Container 120 may include a side wall that includes a laminate of a plurality of layers configured to thermally insulate the plurality of battery cells from external components of power source 104. Side wall layers may include materials that possess characteristics suitable for thermal insulation, as described in the entirety of this disclosure, like fiberglass, air, iron fibers, polystyrene foam, and thin plastic films, to name a few. Side wall may additionally or alternatively electrically insulate battery cells from external components of power source 104 and the layers of which may include polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination.

With continued reference to FIG. 3, battery pack 324 and/or power source 104 may include an end panel including a plurality of electrical connectors and further configured to fix battery cells in alignment with at least side wall. End panel may include a plurality of electrical connectors of a first gender configured to electrically and mechanically couple to electrical connectors of a second gender. The end panel may be configured to convey electrical energy from battery cells to at least a portion of, for example, an eVTOL aircraft. Electrical energy may be configured to power at least a portion of an aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which end panel includes may be configured for power and communication purposes. End panel may be a separate component or may be end cap 204.

With continued reference to FIG. 3, any of the disclosed components or systems, namely power source 104, sense board 212, and/or battery cells may incorporate provisions to dissipate heat energy present due to electrical resistance in integral circuit. Power source 104 includes one or more battery modules wired in series and/or parallel. The presence of a voltage difference and associated amperage inevitably will increase heat energy present in and around power source 104 as a whole. The presence of heat energy in a power system is potentially dangerous by introducing energy possibly sufficient to damage mechanical, electrical, and/or other systems connected to or near power source 104. Power source 104 may include mechanical design elements, one of ordinary skill in the art, may thermodynamically dissipate heat energy away from power source 104. The mechanical design may include, but is not limited to, slots, fins, heat sinks, perforations, a combination thereof, or another undisclosed element.

Heat dissipation may include material selection beneficial to move heat energy in a suitable manner for operation of power source 104. Certain materials with specific atomic structures and therefore specific elemental or alloyed properties and characteristics may be selected in construction of power source 104 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. Power source 104 may include similar or identical features and materials ascribed to power source 104 in order to manage the heat energy produced by these systems and components.

Figure 4:
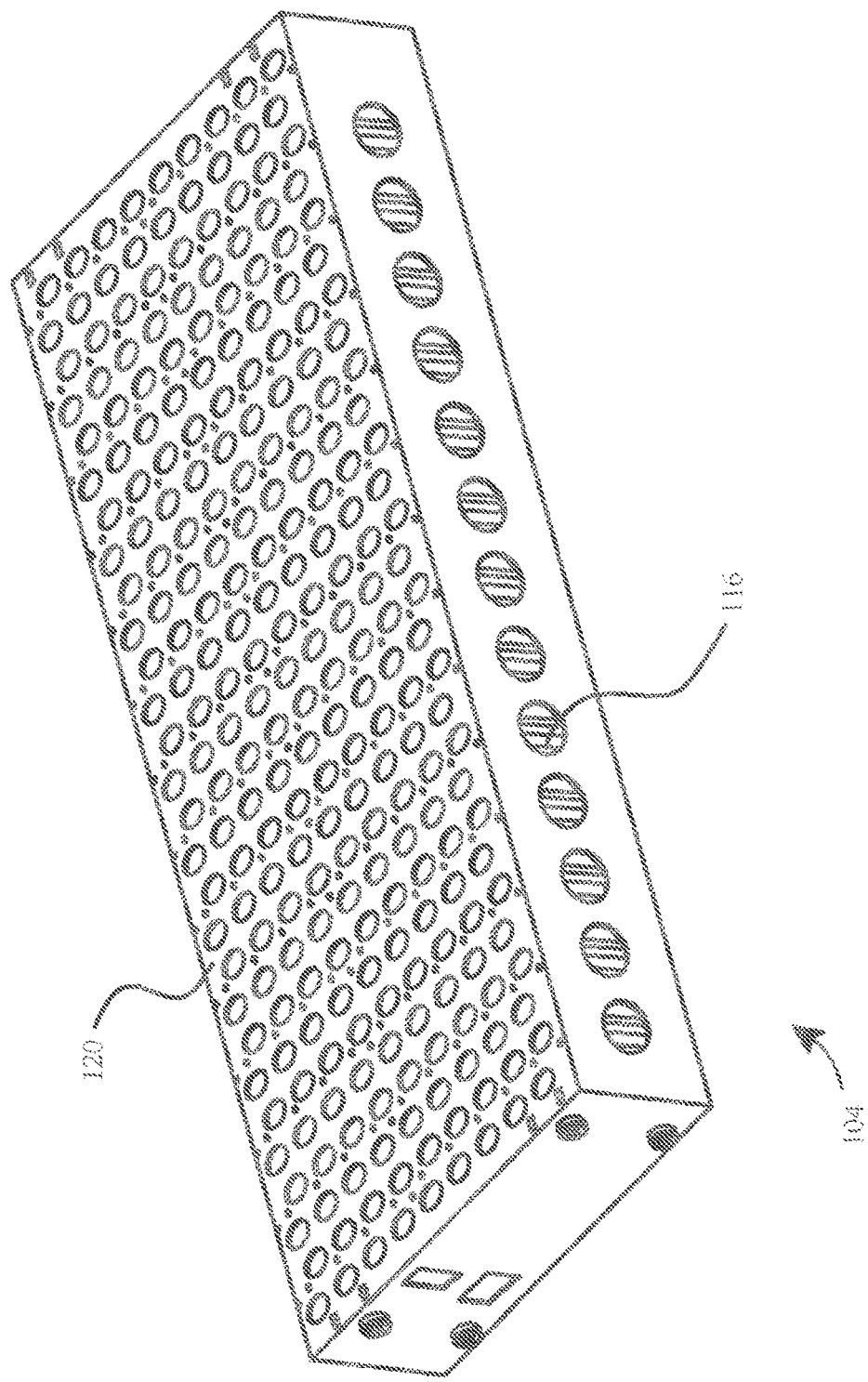
FIG. 4 is an illustration of a battery module and battery module sense board in isometric view in accordance with aspects of the invention.

With reference to FIG. 4, an exemplary embodiment of power source 104 is shown. Furthermore, an exemplary embodiment of container 120 is shown with battery cells 116 disposed therein after being compressed by compression mechanism 108. A plurality of power sources 104 may be assembled together as discussed previously to provide battery pack 324 of FIG. 3.

Figure 5:
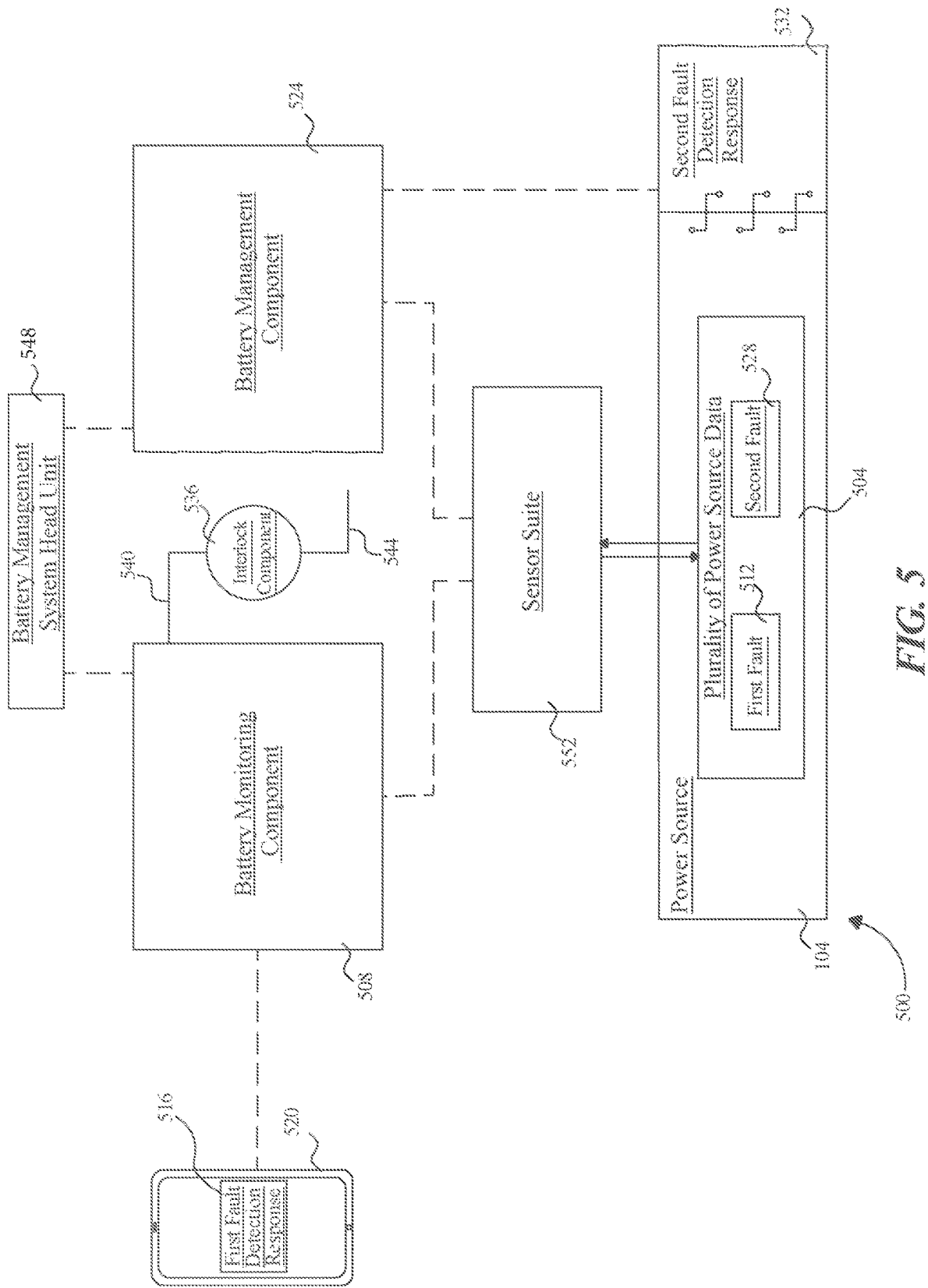
FIG. 5 is a block diagram of an embodiment of a battery management and monitoring system in accordance with aspects of the invention.

FIG. 5 shows a block diagram of an embodiment of a battery management and monitoring system. A sensor suite 552 may be disposed in or on a portion of power source 104 near battery cells 116. Battery pack 324 or power source 104 may include a battery management system head unit 304. For example, battery management system head unit 304 may be disposed on end cap 204 or second end cap 216 of power source 104 or on end panel of battery pack 324 (shown in FIG. 3). In one or more exemplary embodiments, and without limitation, battery management system head unit 304 may be configured to communicate with a flight controller of an aircraft using a controller area network (CAN). Controller area network includes bus. Bus may include an electrical bus. "Bus", for the purposes of this disclosure and in electrical parlance, is any common connection to which any number of loads, which may be connected in parallel, and share a relatively similar voltage may be electrically coupled. Bus may refer to power busses, audio busses, video busses, computing address busses, and/or data busses. Bus may be responsible for conveying electrical energy stored in power source 104 to at least a portion of a system, such as an electric aircraft. Battery management system head unit 548 may comprise wiring or conductive surfaces only in portions required to electrically couple bus to electrical power or necessary circuits to convey that power or signals to their destinations.

Outputs from sensors or any other component present within system may be analog or digital. Onboard or remotely located processors can convert those output signals from sensor suite 552 to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

According to embodiments, the circuitry disposed within or on power source 104 may be shielded from electromagnetic interference. The battery elements and associated circuitry may be shielded by material such as mylar, aluminum, copper a combination thereof, or another suitable material. Power source 104 and associated circuitry may include one or more of the aforementioned materials in their inherent construction or additionally added after manufacture for the express purpose of shielding a vulnerable component. Power source 104 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Still referring to FIG. 5, battery management and monitoring system 500 is disposed on at least a portion of battery pack 324 or power source 104. Battery management and monitoring system 500 may include more than one electrically isolated systems performing at least a portion of the same functions. Battery management and monitoring system 500 may include more than one electrically isolated systems performing redundant functions. Battery management and monitoring system 500 may include more than one electrically isolated systems performing entirely different functions. Battery management and monitoring system 500 may include more than one electrically isolated systems performing entirely separate and distinct functions. Battery management and monitoring system 500 may include one or more physically separated systems disposed on at least a distinct portion of battery pack 324 or any subcomponents thereof. Battery management and monitoring system 500 may include one or more physically isolated systems that perform at least a portion of the same functions. Battery management and monitoring system 500 may include more than one physically isolated systems performing the redundant functions. Battery management and monitoring system 500 may include more than one physically isolated systems performing entirely different functions. Battery management and monitoring system 500 may include more than one physically isolated systems performing entirely separate and distinct functions. In one or more embodiments, at least a portion of battery management and monitoring system 500 may be disposed on sense board 212, or another integrated circuit board component known in the art.

With continued reference to FIG. 5, battery management and monitoring system 500 includes a sensor suite 552. Sensor suite 552 may include any sensor suite described above consistent with the disclosure. Sensor suite 552 is configured to measure a plurality of battery pack data. Plurality battery pack data may include any plurality of power source data 504 described in this disclosure. Sensor suite 552 may include any of the sensors, grouping of sensors, or prefabricated sensor packages as described above with reference to FIGS. 1 and 2. Sensor suite 552 may include an accelerometer. Sensor suite 552 may include a vibrometer, vibration sensor, load cell, pressure sensor, force gauge, a combination thereof, among other sensors configured to measure physical parameters like acceleration, force, vibration, pressure, and the like. Sensor suite 552 may include a voltmeter. Additionally, sensor suite 552 may include a multimeter, configured to measure electrical current, potential difference (voltage), resistance, impedance, capacitance, or other electrical parameters alone or in combination. Sensor suite 552 may include an ohmmeter, ammeter, or other separate electrical sensors. Sensor suite 552 may include a thermocouple. Additionally or alternatively, sensor suite 552 may include a thermometer, RTD, or other sensor configured to measure temperature or heat energy of a system.

With continued reference to FIG. 5, battery management and monitoring system 500 includes a battery monitoring component 508. Battery monitoring component 508 is configured to detect, as a function of plurality of power source data 504, first fault 512 in power source 104. Battery monitoring component 508 may be disposed on at least a portion of an integrated circuit board on or in power source 104 or battery pack 324. Integrated circuit board may be disposed in power source 104 proximate to battery cells or disposed on end cap of power source 104. First fault 512 may include an over-voltage condition of at least a portion of power source 104, for example, a single electrochemical battery cell over-voltage, or a portion thereof. First fault 512 may include an under-voltage condition of at least a portion of power source 104. First fault 512 may be characterized by a comparison, by battery monitoring component 508, of a voltage measurement from sensor suite 552, to a voltage threshold which has been predetermined or calculated by at least a user or additional system, or alternatively, input by a user. First fault 512 may include a temperature rise rate. There may be a threshold temperature rise rate or threshold temperature to which a temperature measurement by sensor suite 552 is compared by battery monitoring component 508. First fault 512 may include a detection of a resistance. This resistance may be measured by sensor suite 552 and compared to a range or threshold resistance input by a user, calculated by at least a portion of an alternate system, or a combination thereof.

With continued reference to FIG. 5, battery monitoring component 508 produces a first fault detection response 516 upon detection of first fault 512. First fault detection response 516 may be generated in response to any of the described variations of first fault 512. This is a non-exhaustive list of possible faults that may be detected as first fault 512, one of ordinary skill in the art would understand the greater number and variation of physical, electrical, or other faults that may be detected by a sensor suite configured to measure characteristics of power source or battery pack. First fault detection response 516 includes notification of a user of the first fault 512 in power source 104. Battery monitoring component 508 communicates first fault detection response 516 to be displayed on graphical user interface (GUI) 520. In an exemplary embodiment, graphical user interface 520 may include a flight display known in the art to be disposed in at least a portion of a cockpit of an electric aircraft. GUI 520 may be disposed on a user device located remotely from the electric aircraft. GUI 520 may be disposed on a computer device located remotely or onboard the electric aircraft. GUI 520 may be disposed on a smartphone located remotely or onboard the electric aircraft. First fault detection response 516 may include a textual display. The textual display may include a warning message to a user, which may include a pilot, whether onboard or remotely located. The textual display may include a message describing the fault. Additionally, or alternatively, the textual display may include a generic message that a fault was detected. The textual display may include where the fault was located within power source 104 or battery pack 324. The textual display may include a suggestion for pilot or user intervention or suggested maintenance procedures. First fault detection response 516 may include an image display. The image display included in first fault detection response 516 may include a depiction of power source 104. The image display may include a depiction of a portion of power source 104. The image display may include a depiction of the portion of power source 104 first fault 512 was detected in. The image display may include a depiction of suggested user operations or suggested maintenance. It should be noted that battery monitoring component 508 is only capable of notifying a user of first fault 512 by first fault detection response 516.

With continued reference to FIG. 5, battery management and monitoring system 500 includes battery management component 524. Battery management component may be consistent with the description of the battery management components hereinabove, namely first and second battery management components. Battery management component 524 is configured to detect, as a function of plurality of power source data 504, second fault 528 in power source 104. Second fault 528 may be characterized exactly like first fault 512. For example, second fault 528 may include an over-voltage condition or temperature rise rate. Second fault 528 may not be characterized like first fault 512. For example, second fault 528 may be an over-voltage condition and first fault 512 may be an undervoltage condition. First fault 512 and second fault 528 may be detected separately from each other, at least partially together, or at the same instant. One of ordinary skill in the art would understand first fault 512 and second fault 528 to have near limitless combinations and/or iterations thereof. First fault 512 does not necessarily need to be detected before second fault 528 chronologically, and largely depends on the active component at the time, which will be described in detail herein. Battery management component 524 is configured to produce a second fault detection response 532 upon receiving detection of second fault 528. Second fault detection response 532 is configured to mitigate second fault 528 in power source 104. "Mitigate", for the purposes of this disclosure, describes operations, procedures, actions, or reconfigurations with the intent to resolve an operational fault in a component of a system. In a non-limiting embodiment, battery management component 524 may control electrical contacts outside of power source 104 or battery pack 324, during, for example, testing and/or charging, such that second fault detection response 532 may disconnect and/or connect electrical contacts when a fault is detected. "Electrical contacts", for the purposes of this disclosure, refer to electronic elements that connect or complete a circuit when contacted. In non-limiting embodiments, electrical contacts may connect power source 104 to external electrical circuits, battery management/monitoring component/system to external electrical circuits, or any two or more circuits or components together. Interlock component 536 may include geometry provisions so as to make it impossible for any fault response to control contacts when power source 104 is installed in aircraft. Alternatively, or additionally, there could be contacts that are connected, and therefore electrical circuits using such contacts made, only when power source 104 is installed in aircraft, only when power source 104 is uninstalled from aircraft, only when power source 104 is being tested, only when aircraft is in flight, or another undisclosed function or state. Contacts could be used to enable one or more of the first fault detection response 516, second fault detection response 532. One of ordinary skill in the art, upon reviewing the entirety of this disclosure, would appreciate the vast number of scenarios, assemblies, configurations, and embodiments using circuits, contacts, and interlocks consistent with this disclosure, and this disclosure does not preclude any configuration thereof. Geometry provisions may include structures that block electrical connections when installed in aircraft that are exposed when uninstalled in aircraft. Battery management component 524 may display that second fault 528 was detected on a web-based tool in addition to second fault detection response 532. In a non-limiting example, battery management component 524 may redirect current around at least a portion of power source 104 if second fault 528 is detected in at least a portion of power source 104. The mitigation would be to bypass the malfunctioning area of the battery pack or automatedly disconnect contacts outside of aircraft, in this non-limiting example. Second fault detection response 532 may additionally include a prioritization of current to a portion of power source 104 that is experiencing a lack of charging to that portion, thus mitigating the charging difference within power source 104. Battery management component 524 may include a contactor control circuit. "Contactor control circuit", for the purposes of this disclosure, describes an electrically controlled switch used for switching an electrical power circuit. The contacts referenced in "contactor control circuit" may be consistent with any contacts consistent with this disclosure. Typically, a contactor control circuit is controlled by a circuit which has a lower power level than the switched circuit. One of ordinary skill in the art would understand that there are a plurality of methods and systems capable of switching circuits electromechanically, like relays, and that a plurality may be used herein substituted for contactor control circuit.

With continued reference to FIG. 5, battery management and monitoring system 500 includes an interlock component 536. Interlock component 536 includes a first mode 540 and a second mode 544. Interlock component 536 is configured to enable battery monitoring component 508 and disable battery management component 524 when in first mode 540. Interlock component is configured to enable battery management component 524 and disable battery monitoring component 508 when in second mode 544. One of ordinary skill in the art would understand that first mode and second mode do not refer to order of operations or chronology, but to more than one distinct mode the interlock component 536 can reconfigure itself into. One of ordinary skill in the art would appreciate from the present disclosure that battery management component 524 and battery monitoring component 508 are enabled and disabled separately. In other words, the enabling of one component does not disable the other automatedly, for example. Interlock component 536 may include a mechanical component. For example, a mechanical interlock component 536 may include a lever, button, switch that is physically interacted with by a user, subsystem, or a combination thereof. Interlock component 536 may include an electrical component. For example, an electrical interlock component 536 may include a circuit that is completed when a certain component is to be enabled. Interlock component 536 may enable battery monitoring component 508 when power source 104 is installed in electric aircraft. In this non-limiting example, a mechanical and/or electrical interlock component disposed in or on power source 104 may be actuated when power source 104 is installed in electric aircraft. Interlock component 536 may include a logic circuit, combinatorial circuit, sequential circuit, finite state machine, analog circuit, or any processor as described in the entirety of this disclosure. Additionally or alternatively, when installed in electric aircraft, interlock component 536 may enter first mode 540, enabling battery monitoring component 508 and disabling battery management component 524. In another non-limiting example, interlock component 536 enters second mode 544 and thus enables battery management component 524 when the battery is uninstalled from the electric aircraft. Interlock component 536 may enter second mode 544, enabling battery management component 524 during charging of power source 104. Interlock component 536 may enter second mode 544, enabling battery management component 524 during testing of power source 104. In a non-limiting embodiment, battery monitoring component 508 is enabled by interlock component 536 when battery pack is installed in electric aircraft, and thus when electric aircraft is in flight mode. It would follow to one of ordinary skill in the art, upon reviewing the entirety of this disclosure, that when battery pack 324 is uninstalled from electric aircraft, battery management component 524 is enabled when battery pack is offboard of electric aircraft. Interlock component 536 may include circuitry, components, processors, or the like that may detect which mode interlock component is in. For example, interlock component 536 may detect electrical phenomena consistent with battery charging, discharging, or switching when battery management component 524 is engaged; sensing may be performed, for instance, by comparison of one or more voltages or other parameters to threshold levels using a comparator, a transistor, or other element connected to a control interface such as a gate, base, and/or input pin of interlock component 536. Interlock component 536 may include provisions such as sensors and/or circuitry to receive a signal, for instance from a flight controller of an aircraft, a manual switch activated by a user, or the like, when electric aircraft is in flight mode and therefore battery monitoring component 508 is engaged. Interlock component 536 may detect when electric aircraft is in certain flight modes like hover, takeoff, landing, vertical takeoff, vertical landing, banks, turns, rolls, climbs, dives, and the like. When interlock component 536 engages battery monitoring component 508 and disengages battery management component 524, sensor suite 552 detects plurality of power source data 504 for first fault 512 within power source 104. Sensor suite 552 transmits first fault 512 to battery monitoring component 508, which in turn transmits first fault detection response 516 to graphical user interface 520, which may be a screen in the cockpit for a pilot to be notified or a client device to which a remotely located user may be notified of first fault 512. When interlock component 536 engages battery management component 524 and disengages battery monitoring component 508, sensor suite 552 detects second fault 528 based on plurality of power source data 504 within power source 104. Sensor suite 552 transmits second fault 528 to battery management component 524. In turn, battery management component transmits second fault detection response 532 to mitigate second fault 528. In other words, faults detected in flight can be detected and displayed to a user, wherein the discretion of the user is used to mitigate faults, as opposed to offboard electric aircraft when battery management system can mitigate risks without user intervention, in a non-limiting example.

With continued reference to FIG. 5, battery management and monitoring system includes battery management system head unit (BMSHU) 548 configured to electronically communicate with a controller. BMSHU 548 may be consistent with any communicatively coupled electronic component described in this disclosure. The controller may be any circuit, computing device, or combination of electronics and power electronics consistent with this disclosure.

Figure 6:
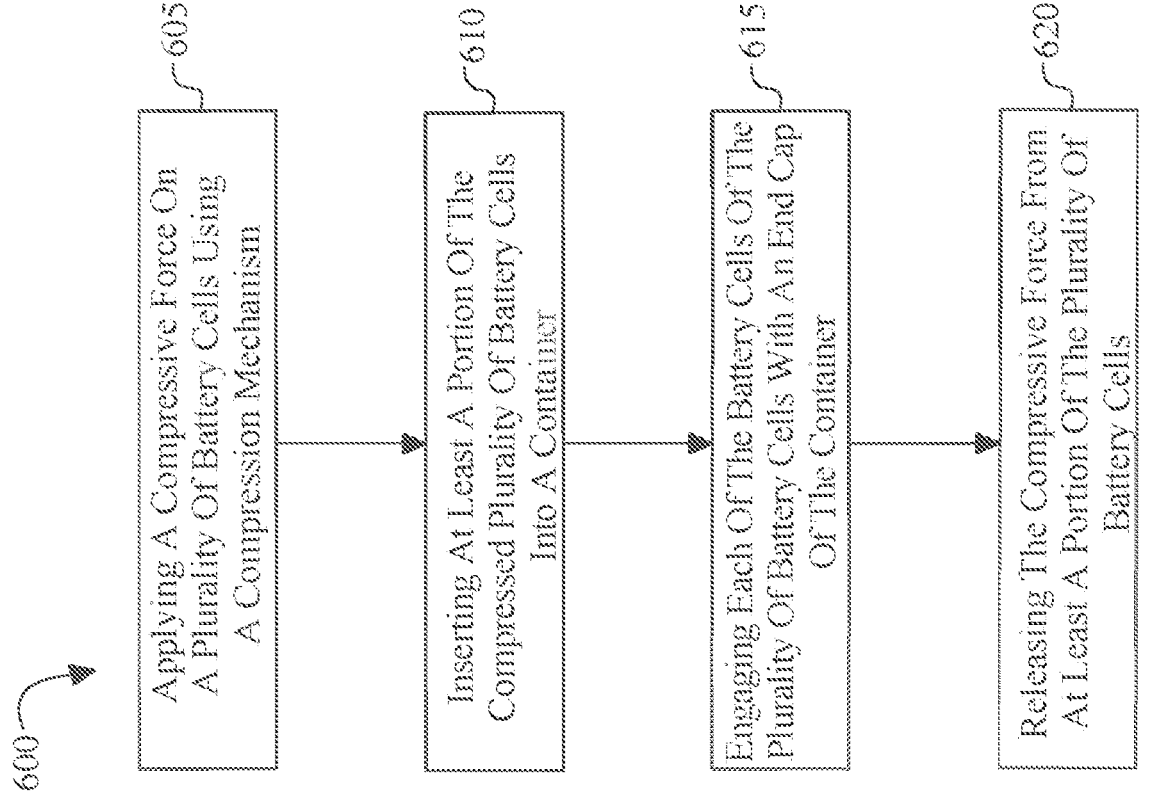
FIG. 6 is a flow diagram illustrating an exemplary power source assembly method in accordance with aspects of the invention.

FIG. 6 shows a flow chart illustrating the power source assembly method 600 in accordance with one or more embodiments of the present disclosure. As shown in block 605, method 600 includes applying compressive force 112 on plurality of battery cells 116 using compression mechanism 108 of the power source assembly system 100 as described in this disclosure.

As shown in block 610, method 600 includes the step of inserting at least a portion of the compressed plurality of battery cells 116 into container 120. For example, battery cells 116 may be moved perpendicular to compression force 112 to be inserted into opening 144 of container 120.

As shown in block 615, method 600 includes the step of engaging each of battery cells 116*a-n* of plurality of battery cells 116 with end cap 204 of container 120. In one or more embodiments, end cap 204 is configured to maintain the predetermined arrangement of plurality of battery cells 116.

As shown in block 620, method 600 includes the step of releasing compressive force 112 from at least a portion of plurality of battery cells 116. In one or more embodiments, plurality of battery cells 116 disposed within container 120 creates power source assembly system 100. Power source 104 may be used to supply energy to various types of systems. For example, power source 104 may provide energy to a vehicle, as discussed in this disclosure. In one or more embodiments, the method of 600 may further include connecting container 120 to an electrical system of a vehicle; and providing power to at least a portion of the vehicle. In an exemplary embodiment, the vehicle may be an electric aircraft. For example, the vehicle may be an eVOTL aircraft, as discussed in this disclosure.

It is to be noted that any one or more of the aspects and embodiments described in this disclosure may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described in this disclosure. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described in this disclosure.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
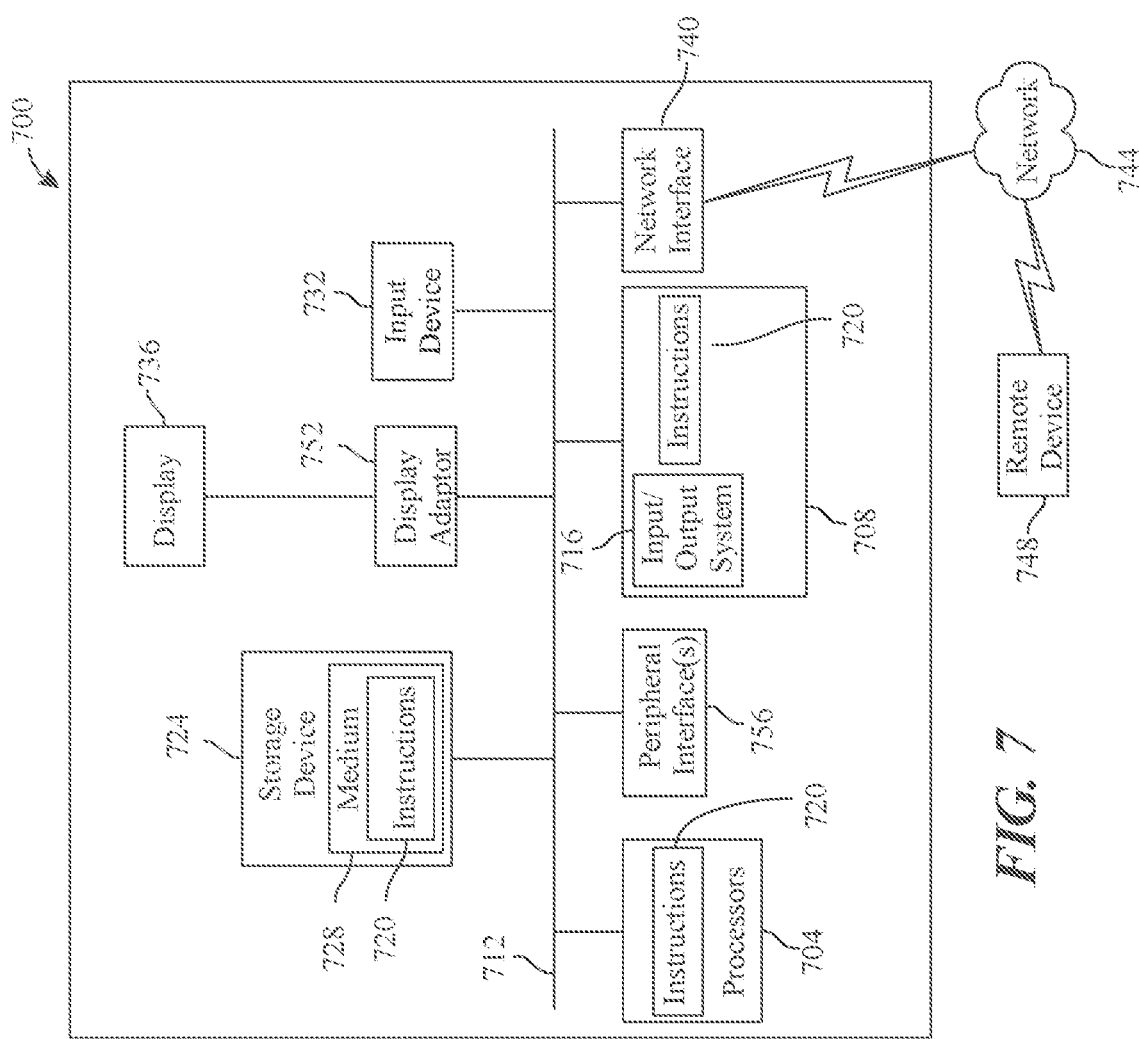
FIG. 7 is a block diagram of a computing system that can be used to implement any one or more of the methodologies disclosed in this disclosure and any one or more portions thereof in accordance with aspects of the invention.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described in this disclosure is merely illustrative of the application of the principles of the present invention. Additionally, although particular methods in this disclosure may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system comprising:
   a compression mechanism including a set of moveable arms configured to apply a compressive force on a plurality of battery cells to compress at least a portion of the plurality of battery cells; and
   a container dimensioned to receive at least a portion of the compressed plurality of battery cells therein,
   wherein the container includes a groove disposed along a first surface of the container and configured to engage a complimentary rib disposed along an end surface of the plurality of battery cells.

2. The system of claim 1, wherein the groove is further configured to align the at least a portion of the plurality of battery cells relative to the container.

3. The system of claim 1, wherein the container further include a slot on a second surface of the container opposite the first surface, and wherein the set of moveable arms are configured to traverse along the slot and continue to apply the compressive force on the plurality of battery cells as the at least a portion of the compressed plurality of battery cells is inserted into the container.

4. The system of claim 1, wherein the container further includes an end cap configured to encapsulate the at least a portion of the compressed plurality of battery cells within a body of the container.

5. The system of claim 4, wherein the end cap includes a non-electrically conductive component.

6. The system of claim 4, wherein the container further includes a sensor configured to detect when the plurality of battery cells is engaged with the end cap.

7. The system of claim 1, wherein the container further includes a sense board configured to detect a temperature of one or more battery cells of the plurality of battery cells.

8. The system of claim 1, wherein the compression mechanism further includes a guide, and wherein the set of moveable arms is configured to transverse through the guide to move the plurality of battery cells toward the container.

9. The system of claim 1, wherein the set of moveable arms includes a front arm and a rear arm, wherein the front arm is configured to
move away from a front portion of the at least a portion of the compressed plurality of battery cells as the front portion is inserted into the container, and
wherein the rear arm is configured to:
move away from a rear portion of the at least a portion of the compressed plurality of battery cells as the rear portion is inserted into the container.

10. The system of claim 1, wherein the container further includes an electrical contact having an electrical connection with one or more battery cells of the plurality of battery cells.

11. The system of claim 1, wherein the container is connected to an electrical system of a vehicle.

12. The system of claim 11, wherein the vehicle is an electric aircraft.

13. The system of claim 1, wherein the system further includes a battery management unit configured to monitor a status of the plurality of battery cells.

14. A method comprising:
applying a compressive force on a plurality of battery cells to compress at least a portion of the plurality of battery cells by using a compression mechanism, wherein the compression mechanism includes a set of moveable arms; and
inserting at least a portion of the compressed plurality of battery cells into a container,
wherein the container includes a groove disposed along a first surface of the container and configured to engage a complimentary rib disposed along an end surface of the plurality of battery cells.

15. The method of claim 14, wherein the container further includes a slot on a second surface of the container opposite the first surface, and the method further includes traversing the set of moveable arms along the slot and continuing to apply the compressive force on the plurality of battery cells as the at least a portion of the compressed plurality of battery cells is inserted into the container.

16. The method of claim 14, wherein the container further includes an end cap configured to maintain a predetermined arrangement of the plurality of battery cells, and wherein the method further includes:
engaging one or more battery cells of the plurality of battery cells with the end cap of the container.

17. The method of claim 16, wherein the container further includes a sensor configured to detect when the plurality of battery cells is engaged with the end cap.

18. The method of claim 14, wherein the set of moveable arms includes a front arm and a rear arm, and wherein the method further includes:
moving the front arm away from a front portion of the at least a portion of the compressed plurality of battery cells as the front portion is inserted into the container; and
moving the rear arm away from a rear portion of the at least a portion of the compressed plurality of battery cells as the rear portion is inserted into the container.

19. The method of claim 14, further including:
connecting the container to an electrical system of a vehicle; and
providing power to at least a portion of the vehicle.

20. The method of claim 19, wherein the vehicle is an electric aircraft.

* * * * *